Patented Apr. 7, 1953

2,634,226

UNITED STATES PATENT OFFICE 2,634,226

INSECTICIDAL UNSYMMETRICAL DIETHYL DIOCTYL PYROPHOSPHATES

Gennady M. Kosolapoff, Auburn, Ala., assignor to Monsanto Chemical Company, St. Louis, Mo., a corporation of Delaware No Drawing. Application June 3, 1949, Serial No. 97,074

4 Claims. (Cl. 167—22)

This invention provides new esters of pyrophosphoric acid; namely, the unsym. diethyl dioctyl pyrophosphate and specifically the unsym. diethyl bis(2-ethylhexyl) pyrophosphate. The formulae of my new compounds are:

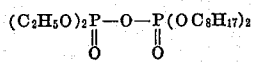

The radical $C_8H_{17}$— may be derived from n-octyl, 2-ethylhexyl or the secondary alcohol, octanol-2.

The present compounds have been found to be soluble in petroleum hydrocarbon oils of the type used as insecticide carriers and also to possess a pronounced insecticidal activity. For this purpose they may be combined with a carrier such as a dust, a solvent, or an aqueous emulsion and applied to insects.

The present compounds may be prepared by the process disclosed in my copending application Serial No. 744,036, filed April 25, 1947 now Patent No. 2,486,658, in which pyrophosphoric acid esters are prepared by the reaction of a dialkyl chlorophosphate and trialkyl phosphate. For the preparation of the present compounds the reaction which is carried out may be written as follows:

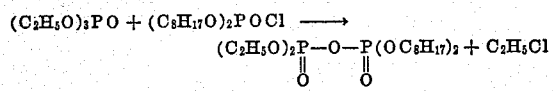

The process is illustrated by the following example:

Example

*Unsym. diethyl bis(2-ethylhexyl) pyrophosphate.*—52 g. (0.17 mole) of di(2-ethylhexyl) phosphite was chlorinated to the corresponding chlorophosphate. To this compound was added 145 g. (0.8 mole) of triethyl phosphate. The mixture was refluxed for one and one-half hours at 110–25° C. and pressures in the neighborhood of 30–40 mm. At the end of this time ethyl chloride evolution was not evident. A sample of the mixture tested for chloride ion was strongly positive, indicating incomplete reaction. The mixture was therefore heated for two hours longer at 125–30° C., then at a temperature of 140° C. for approximately eight hours. The mixture was then stripped by heating up to a pot temperature of 125° C. at 1 mm. pressure, at which time 131 g. of triethyl phosphate was recovered. The residue was only slightly chloride ion positive. The product had a refractive index $n_D^{25}=1.4390$. $P=12.25\%$, theory, $13.5\%$.

A molecular weight determination by the cryoscopic method in benzene gave a molecular weight of 460 (theory, 458.5).

The corresponding diethyl di-n-octyl pyrophosphate or the diethyl di(sec.-2-octyl) pyrophosphate may be made in a similar fashion.

The compounds of the present invention may be formulated into insecticidal compositions in any desired form, for example, as dusts, aqueous emulsions or oil solutions. For example, a dust composition may be prepared by applying from 3% to 10% of the compound to an inert carrier, such as finely divided pyrophyllite. The resulting dust can then be applied to plants for the purpose of destroying insect life found thereon, such as aphids and red spiders. The compositions of the present invention may also be dissolved in petroleum solvents and are useful in this form as fly sprays.

Illustrative of the insecticidal activity of the present compound, the diethyl bis(2-ethylhexyl)-pyrophosphate compound was applied to several insects with the following percent kill at the indicated concentration.

| Insect | Parts Per Million Concentration | | | | | | |
|---|---|---|---|---|---|---|---|
| | 5,000 | 2,500 | 1,250 | 625 | 100 | 50 | 25 |
| Myzus porosus | | | | | 99.5 | 73.9 | 35.1 |
| Musca domestica | 99.6 | 81.7 | 51.8 | 28.5 | | | |

In the above test, solutions of the indicated concentration were applied to the insect by means of an atomizer-type spray. When water solutions or emulsions are prepared, it is generally advisable to employ a wetting or emulsifying agent, such as sodium dodecylbenzene sulfonate to aid in forming the emulsion and also to wet the insects and vegetation upon which the spray is applied.

The present esters are soluble in all proportions in liquid petroleum aliphatic hydrocarbon fractions, boiling between 370° F. and 510° F. Concentrated solutions containing high proportions of the ester, namely, from 10% to 50% or more by weight may be prepared. Such concentrated solutions are conveniently employed in the preparation of more dilute solutions or water-oil emulsions of the esters which are suitable for insect spraying purposes.

What I claim is:

1. An unsym. diethyl dioctyl pyrophosphate.

2. Unsym. diethyl bis(2-ethylhexyl) pyrophosphate.

3. An insecticidal composition comprising unsym. diethyl dioctyl pyrophosphate combined with an insecticide carrier.

4. An insecticidal composition comprising unsym. diethyl bis(2-ethylhexyl) pyrophosphate dissolved in a hydrocarbon solvent.

GENNADY M. KOSOLAPOFF.

REFERENCES CITED

The following references are of record in the file of this patent:

UNITED STATES PATENTS

| Number | Name | Date |
| --- | --- | --- |
| 2,402,703 | Woodstock | June 25, 1946 |
| 2,486,658 | Kosolapoff | Nov. 1, 1949 |
| 2,495,220 | Bell | Jan. 24, 1950 |

OTHER REFERENCES

Manufacturing Chemist and Manufacturing Perfumer, November 1947, Volume XVIII, Number 11, page 506.